United States Patent
Arbuckle et al.

(10) Patent No.: US 10,198,005 B2
(45) Date of Patent: Feb. 5, 2019

(54) STATION KEEPING AND WAYPOINT TRACKING METHODS

(71) Applicant: Brunswick Corporation, Lake Forest, IL (US)

(72) Inventors: Jason S. Arbuckle, Horicon, WI (US); Thomas S. Kirchhoff, Fond Du Lac, WI (US); Michael J. Lemancik, Fond Du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 112 days.

(21) Appl. No.: 15/416,359

(22) Filed: Jan. 26, 2017

(65) Prior Publication Data

US 2017/0255201 A1 Sep. 7, 2017

Related U.S. Application Data

(60) Provisional application No. 62/301,887, filed on Mar. 1, 2016.

(51) Int. Cl.
*G05D 1/00* (2006.01)
*G05D 1/02* (2006.01)
(Continued)

(52) U.S. Cl.
CPC ........... *G05D 1/0206* (2013.01); *B63H 21/21* (2013.01); *B63H 25/04* (2013.01); *B63H 25/42* (2013.01);
(Continued)

(58) Field of Classification Search
None
See application file for complete search history.

(56) References Cited

U.S. PATENT DOCUMENTS

| 3,187,704 A | 6/1965 | Shatto, Jr. et al. |
| 3,688,252 A | 8/1972 | Thompson |

(Continued)

FOREIGN PATENT DOCUMENTS

| EP | 816962 A1 | 7/1998 |
| EP | 2161542 A1 | 3/2010 |

(Continued)

OTHER PUBLICATIONS

Ward et al., "Method and System for Close Proximity Collision Detection", U.S. Appl. No. 14/807,217, filed Jul. 23, 2015.

(Continued)

*Primary Examiner* — James M McPherson
(74) *Attorney, Agent, or Firm* — Andrus Intellectual Property Law, LLP

(57) ABSTRACT

A method for controlling movement of a marine vessel includes controlling a propulsion device to automatically maneuver the vessel along a track including a series of waypoints, and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point that is at or near the stopover waypoint.

22 Claims, 5 Drawing Sheets

(51) Int. Cl.
*B63H 21/21* (2006.01)
*B63H 25/04* (2006.01)
*B63H 25/42* (2006.01)
*B63J 99/00* (2009.01)

(52) U.S. Cl.
CPC .............. *B63J 99/00* (2013.01); *G05D 1/0208* (2013.01); *B63B 2213/02* (2013.01); *B63H 2021/216* (2013.01); *B63H 2025/045* (2013.01); *B63J 2099/008* (2013.01)

(56) References Cited

U.S. PATENT DOCUMENTS

| | | |
|---|---|---|
| 3,715,571 A | 2/1973 | Braddon |
| 3,771,483 A | 11/1973 | Spencer |
| 4,253,149 A | 2/1981 | Cunningham et al. |
| 4,428,052 A | 1/1984 | Robinson et al. |
| 4,513,378 A | 4/1985 | Antkowiak |
| 4,769,773 A | 9/1988 | Shatto, Jr. |
| 4,939,661 A | 7/1990 | Barker et al. |
| 4,975,709 A | 12/1990 | Koike |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |
| 5,386,368 A | 1/1995 | Knight |
| 5,390,125 A | 2/1995 | Sennott et al. |
| 5,491,636 A * | 2/1996 | Robertson .............. B63H 25/42 114/144 B |
| 5,736,962 A | 4/1998 | Tendler |
| 5,884,213 A | 3/1999 | Carlson |
| 6,059,226 A | 5/2000 | Cotton et al. |
| 6,092,007 A | 7/2000 | Cotton et al. |
| 6,230,642 B1 | 5/2001 | McKenney et al. |
| 6,234,853 B1 | 5/2001 | Lanyi et al. |
| 6,273,771 B1 | 8/2001 | Buckley et al. |
| 6,308,651 B2 | 10/2001 | McKenney et al. |
| 6,377,889 B1 | 4/2002 | Soest |
| 6,446,003 B1 | 9/2002 | Green et al. |
| 6,485,341 B1 | 11/2002 | Lanyi et al. |
| 6,604,479 B2 | 8/2003 | McKenney et al. |
| 6,678,589 B2 | 1/2004 | Robertson et al. |
| 6,848,382 B1 | 2/2005 | Bekker |
| 6,995,527 B2 | 2/2006 | DePasqua |
| 7,140,315 B2 | 11/2006 | Okuyama |
| 7,267,068 B2 | 9/2007 | Bradley et al. |
| 7,268,703 B1 | 9/2007 | Kabel et al. |
| 7,305,928 B2 | 12/2007 | Bradley et al. |
| 7,366,593 B2 | 4/2008 | Fujimoto et al. |
| 7,398,742 B1 | 7/2008 | Gonring |
| 7,416,458 B2 | 8/2008 | Suemori et al. |
| 7,467,595 B1 | 12/2008 | Lanyi et al. |
| 7,476,134 B1 | 1/2009 | Fell et al. |
| 7,538,511 B2 | 5/2009 | Samek |
| 7,561,886 B1 | 7/2009 | Gonring et al. |
| 7,577,526 B2 | 8/2009 | Kim et al. |
| 7,630,798 B2 | 8/2009 | Mossman et al. |
| 7,727,036 B1 | 6/2010 | Poorman et al. |
| 8,050,630 B1 | 11/2011 | Arbuckle |
| 8,082,100 B2 | 12/2011 | Grace et al. |
| 8,145,370 B2 | 3/2012 | Borrett |
| 8,145,371 B2 | 3/2012 | Rae et al. |
| 8,150,621 B1 * | 4/2012 | Phillips ................ G05D 1/0206 701/411 |
| 8,155,811 B2 | 4/2012 | Noffsinger et al. |
| 8,215,252 B1 | 7/2012 | Chun |
| 8,265,812 B2 | 9/2012 | Pease |
| 8,326,472 B2 | 12/2012 | Igarashi et al. |
| 8,417,399 B2 | 4/2013 | Arbuckle et al. |
| 8,478,464 B2 | 7/2013 | Arbuckle et al. |
| 8,480,445 B2 | 7/2013 | Morvillo |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,645,012 B2 | 2/2014 | Salmon et al. |
| 8,694,248 B1 | 4/2014 | Arbuckle et al. |
| 8,761,976 B2 | 6/2014 | Salmon et al. |
| 8,777,681 B1 | 7/2014 | McNalley et al. |
| 8,807,059 B1 | 8/2014 | Samples et al. |
| 8,831,868 B2 | 9/2014 | Grace et al. |
| 8,924,054 B1 | 12/2014 | Arbuckle et al. |
| 9,039,468 B1 | 5/2015 | Arbuckle et al. |
| 9,110,467 B2 | 8/2015 | Yuet et al. |
| 9,132,900 B2 | 9/2015 | Salmon et al. |
| 9,132,903 B1 | 9/2015 | Gable et al. |
| 9,162,743 B2 | 10/2015 | Grace et al. |
| 9,248,898 B1 | 2/2016 | Kirchhoff et al. |
| 9,359,057 B1 | 6/2016 | Andrasko et al. |
| 9,377,780 B1 | 6/2016 | Arbuckle et al. |
| 9,676,464 B2 | 6/2017 | Johnson et al. |
| 9,927,520 B1 | 3/2018 | Ward et al. |
| 9,952,595 B2 | 4/2018 | Arbuckle et al. |
| 2003/0191562 A1 | 10/2003 | Robertson et al. |
| 2004/0221787 A1 | 11/2004 | McKenney et al. |
| 2005/0164569 A1 | 7/2005 | Kaji et al. |
| 2005/0170713 A1 | 8/2005 | Okuyama |
| 2006/0089794 A1 | 4/2006 | DePasqua |
| 2006/0116796 A1 | 6/2006 | Fossen et al. |
| 2007/0017426 A1 | 1/2007 | Kaji et al. |
| 2007/0032923 A1 | 2/2007 | Mossman et al. |
| 2007/0089660 A1 | 4/2007 | Bradley et al. |
| 2007/0162207 A1 | 7/2007 | Shimo et al. |
| 2007/0178779 A1 | 8/2007 | Takada et al. |
| 2007/0203623 A1 | 8/2007 | Saunders et al. |
| 2007/0233389 A1 | 10/2007 | Stephens |
| 2009/0037040 A1 | 2/2009 | Salmon et al. |
| 2009/0171520 A1 | 7/2009 | Kaji |
| 2009/0276148 A1 * | 11/2009 | Arvidsson ............ B63C 9/0005 701/116 |
| 2010/0023192 A1 | 1/2010 | Rae et al. |
| 2010/0070124 A1 * | 3/2010 | Yeager ................ G05D 1/0022 701/25 |
| 2010/0109944 A1 | 5/2010 | Whitehead et al. |
| 2011/0153126 A1 | 6/2011 | Arbuckle et al. |
| 2011/0288714 A1 * | 11/2011 | Flohr .................. G05D 1/0011 701/27 |
| 2012/0129410 A1 | 5/2012 | Tyers |
| 2012/0130570 A1 | 5/2012 | Pease |
| 2012/0248259 A1 | 10/2012 | Page et al. |
| 2013/0080044 A1 | 3/2013 | Tyers et al. |
| 2013/0297104 A1 | 11/2013 | Tyers et al. |
| 2014/0114509 A1 | 4/2014 | Venables et al. |
| 2014/0362661 A1 * | 12/2014 | Muijzert .............. G01V 1/3808 367/15 |
| 2015/0089427 A1 | 3/2015 | Akuzawa |
| 2015/0277442 A1 | 10/2015 | Ballou |
| 2015/0346730 A1 | 12/2015 | Stephens et al. |
| 2016/0016651 A1 * | 1/2016 | Anderson .............. B63H 25/04 701/2 |
| 2016/0101838 A1 | 4/2016 | Kojima |
| 2016/0125739 A1 | 5/2016 | Stewart et al. |
| 2016/0246300 A1 | 8/2016 | Langford-Wood |
| 2016/0252907 A1 | 9/2016 | Parkinson |
| 2016/0299507 A1 * | 10/2016 | Shah .................... G05D 1/0206 |
| 2016/0334792 A1 | 11/2016 | Jopling |
| 2017/0205828 A1 | 7/2017 | Estabrook |
| 2017/0205829 A1 | 7/2017 | Tyers |
| 2017/0210449 A1 | 7/2017 | Frisbie et al. |
| 2017/0255200 A1 | 9/2017 | Arbuckle et al. |
| 2017/0277189 A1 | 9/2017 | Johnson et al. |
| 2017/0349257 A1 | 12/2017 | Hara et al. |
| 2017/0365175 A1 | 12/2017 | Harnett |
| 2018/0015994 A1 | 1/2018 | Kishimoto et al. |

FOREIGN PATENT DOCUMENTS

| | | |
|---|---|---|
| EP | 2952994 | 12/2015 |
| GB | 1173442 | 12/1969 |
| JP | 58061097 | 4/1983 |
| JP | 05-203638 A | 8/1993 |
| JP | 7223591 | 8/1995 |

(56) References Cited

FOREIGN PATENT DOCUMENTS

| | | |
|---|---|---|
| JP | 2926533 B2 | 7/1997 |
| JP | 11-129978 A | 5/1999 |
| JP | 2001-287697 | 10/2001 |
| JP | 2002-178990 | 6/2002 |
| JP | 2002173091 A | 6/2002 |
| JP | 2003276677 A | 10/2003 |
| JP | 200442884 A | 2/2004 |
| JP | 2004355105 A | 12/2004 |
| JP | 2005-200004 | 7/2005 |
| JP | 2006-137309 | 6/2006 |
| JP | 2006137309 A | 6/2006 |
| JP | 2009-227035 | 10/2009 |
| JP | 2009-241738 | 10/2009 |
| JP | 2011128943 | 6/2011 |
| JP | 5042906 B2 | 7/2012 |
| JP | 2012528417 A | 11/2012 |
| JP | 5226355 B2 | 7/2013 |
| JP | 2014065495 | 4/2014 |
| JP | 200546034 A | 2/2015 |
| WO | 9205505 A1 | 4/1992 |
| WO | WO 2006058400 | 6/2006 |
| WO | WO 2014033457 | 3/2014 |
| WO | WO 2016104031 | 6/2016 |

OTHER PUBLICATIONS

Poorman et al., "Multilayer Control System and Method for Controlling Movement of a Marine Vessel", U.S. Appl. No. 11/965,583, filed Dec. 27, 2007.
Andrasko et al., "System and Method for Controlling Handling of a Marine Vessel", U.S. Appl. No. 14/484,702, filed Sep. 12, 2014.
Extended European Search Report in corresponding EP Application No. 17020062.0 dated Jul. 6, 2017.
Arbuckle et al., "Station Keeping Methods," Unpublished U.S. Appl. No. 15/445,031, filed Feb. 28, 2017.
Arbuckle et al., "Station Keeping Methods," Unpublished U.S. Appl. No. 15/887,372, filed Feb. 2, 2018.
Gonring, "System and Method for Controlling Course of a Marine Vessel," Unpublished U.S. Appl. No. 15/415,095, filed Jan. 25, 2017.
Arbuckle et al., "Methods for Positioning Marine Vessels," Unpublished U.S. Appl. No. 16/028,019, filed Jul. 5, 2018.

* cited by examiner

STATION KEEPING AND WAYPOINT TRACKING METHODS

CROSS-REFERENCE TO RELATED APPLICATION

The present application claims the benefit of U.S. Provisional Application Ser. No. 62/301,887, filed on Mar. 1, 2016, which is hereby incorporated by reference.

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Other patents describing various autopilot, station keeping, and waypoint tracking features and related system and method improvements include: U.S. Pat. Nos. 7,267,068; 7,561,886; 8,050,630; 8,417,399; 8,694,248; 8,777,681; 8,807,059; 8,924,054; 9,039,468; 9,132,903; 9,248,898; 9,377,780; and unpublished U.S. patent application Ser. No. 14/484,702, filed Sep. 12, 2014, and Ser. No. 14/807,217, filed Jul. 23, 2015. Each of these patents and applications is hereby incorporated by reference herein.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure is of a method for controlling movement of a marine vessel powered by a marine propulsion system commanded by a control module. The method is carried out by the control module and comprises controlling a propulsion device of the propulsion system so as to automatically maneuver the vessel along a track including a series of waypoints and determining whether a next waypoint in the series of waypoints is a predetermined stopover waypoint at or near which the vessel is to electronically anchor. In response to determining that the next waypoint is the stopover waypoint, the method includes calculating a distance between the vessel and the stopover waypoint. In response to the calculated distance being less than or equal to a threshold distance, the method includes decreasing a magnitude of thrust of the propulsion device. In response to sensing that the vessel has thereafter slowed to a first threshold speed, the method includes controlling the propulsion system to further decrease vessel speed. In response to sensing that one of (a) the vessel has thereafter slowed to a second threshold speed that is less than the first threshold speed or (b) the calculated distance has thereafter begun to increase, the method includes controlling the propulsion device so as to maintain the vessel at an anchor point that is at or near the stopover waypoint.

Another example of the present disclosure is of a system for controlling movement of a marine vessel. The system includes a marine propulsion system including a marine propulsion device and a control module that controls a magnitude of thrust, a shift position, and a steering angle of the propulsion device. An electronic navigation device provides to the control module a desired track including a series of waypoints, wherein the series of waypoints includes a stopover waypoint at or near which the vessel is to electronically anchor. A position determination device provides to the control module a current, actual geographic location of the vessel as the vessel navigates the track under the command of the control module. In response to determining that the vessel has reached a threshold distance from the stopover waypoint, the control module commands the propulsion device's magnitude of thrust to decrease. In response to sensing that the vessel has thereafter slowed to a first threshold speed, the control module commands the propulsion system to further decrease vessel speed. In response to sensing that one of (a) the vessel has thereafter slowed to a second threshold speed that is less than the first threshold speed or (b) a distance between the vessel and the stopover waypoint has thereafter begun to increase, the control module controls at least one of the magnitude of thrust, the shift position, and the steering angle of the propulsion device so as to maintain the vessel at an anchor point that is at or near the stopover waypoint.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
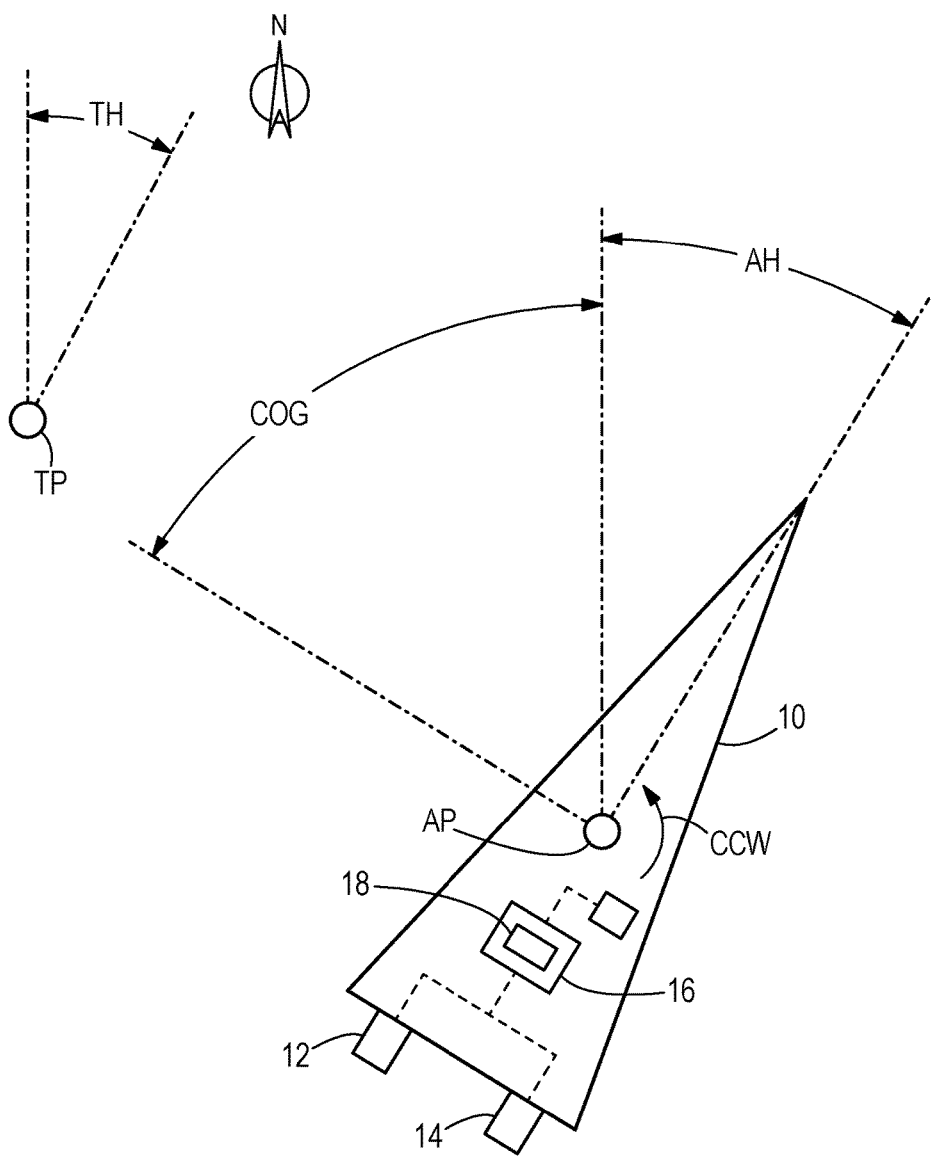
FIG. 1 is a schematic for purposes of illustrating a prior art station keeping method.

Referring to FIG. 1, in a station keeping mode, a marine vessel 10 can be maintained in a single global position (defined by latitude and longitude) and at a predetermined heading by way of an algorithm that controls the vessel's propulsion devices 12, 14 to counteract the effects of wind, waves, current, etc. that would tend to move the vessel 10 off this location and/or to a new heading. In essence, the propulsion devices 12, 14 are controlled to maintain the vessel 10 at a virtual anchor point. A control module 16 that controls thrust and angular orientation of the propulsion devices 12, 14 acts as a joystick and calculates left/right, fore/aft, and yaw commands required to drive the vessel's position error and heading error to zero. The control module 16 can control one or more propulsion devices 12, 14 to do so, which may be located at the rear of the vessel 10 such as with outboards or stern drives, under the vessel 10 such as with pod drives, or at the front, back, or sides of the vessel 10 such as with thrusters.

An example of the inputs to the control module's calculations is shown in FIG. 1. In this example, the actual global position (AP) of a preselected point on the vessel 10, as determined by a GPS receiver, is not equal to a setpoint target global position (TP), and thus the control module 16 will calculate a course over ground (COG) that the vessel 10 must travel to reach the target global position TP. Additionally, a setpoint target heading (TH) is 27 degrees from north, while the actual heading (AH) read from a compass or an inertial measurement unit (IMU) is 35.8 degrees. The control module 16 will therefore determine that a counterclockwise yaw movement (arrow CCW) of 8.8 degrees is required to return the vessel 10 to the target heading TH.

The control module 16 determines when and how much corrective action to take according to a three-dimensional (left/right, fore/aft, and yaw) proportional, integral, and derivative (PID) control algorithm performed by a feedback controller 18 of the control module 16. The integral term allows the control system to reject constant and slowly varying disturbances (e.g., current) while maintaining near zero position error. The proportional and derivative terms handle the quickly varying disturbances. The integral term is also considered to have memory and can take time to increase or decrease, especially if the disturbance forces grow. The PID feedback controller 18 computes a desired force in the forward/back and left/right directions with reference to the marine vessel 10, along with a desired yaw moment relative to the marine vessel 10, in order to null the error elements. The computed force and moment elements are then transmitted to the vessel propulsion system, which delivers the requested forces and moments by positioning the independently steerable propulsion devices 12, 14, controlling the power provided to the propellers of each device, and controlling the thrust vector directions of both devices. Such automatic correction of the position and heading of the marine vessel 10 can be achieved according to the principles described in U.S. Pat. No. 7,305,928, which was incorporated by reference herein above.

Besides station keeping functionality, a marine vessel can be controlled in an auto-heading or a waypoint tracking mode, as disclosed in U.S. Pat. No. 9,377,780, which was incorporated by reference above. In the waypoint tracking mode, the marine vessel 10 is automatically guided to a waypoint (e.g., a global position defined in terms of latitude and longitude) or to several waypoints along a track. To initiate waypoint tracking mode, for example, the operator of the marine vessel 10 may select a point or a track from a chart plotter and select waypoint tracking mode from the chart plotter or from a separate autopilot. The control module 16 then obtains a commanded course from the autopilot according to the information provided by the chart plotter. The control module 16 then automatically guides the marine vessel 10 to each waypoint along the track (or to the single selected waypoint) by providing steering and thrust commands to the propulsion devices 12, 14.

Figure 3:
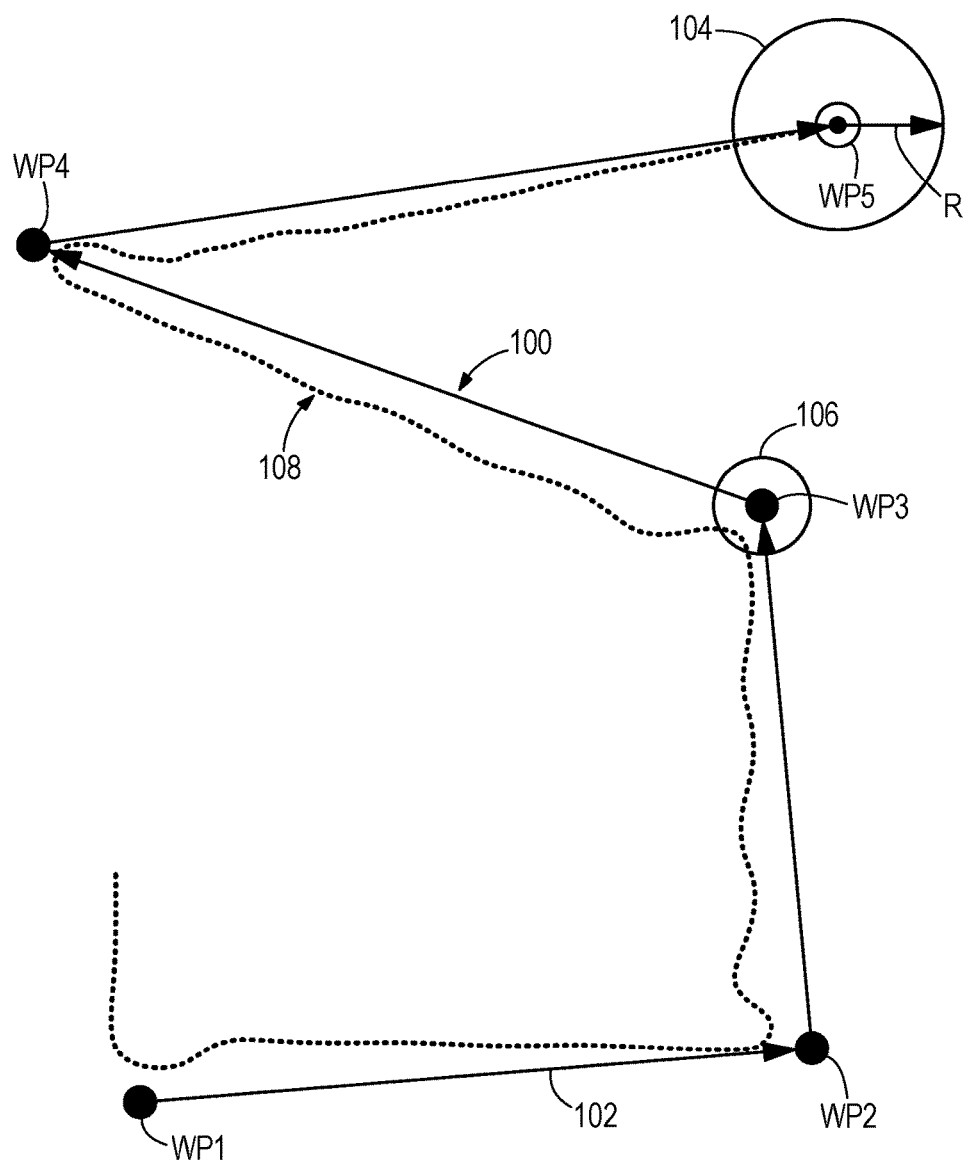
FIG. 3 is used to illustrate the concept of station keeping at a stopover waypoint in a track, such as at the end of the track.

For example, referring to FIG. 3, the points WP1, WP2, WP3, WP4, and WP5 are waypoints in a track 100 defined by the solid line with arrows. By way of example, the commanded course from waypoint WP1 to waypoint WP2 is along the solid line arrow 102 connecting the two points. If the marine vessel 10 veers off this course 102, such as due to the effect of wind, waves, or the like, the control module 16 determines the corrective action needed to resume the commanded course 102 so as to guide the marine vessel 10 back on to the track 100. The feedback controller 18 of the control module 16 uses a course-over-ground feedback signal to determine how and to what extent the propulsion devices 12, 14 must be steered (and/or provided with what thrust) in order to re-orient the marine vessel 10 to the commanded course 102. The control module 16 provides steering and/or thrust commands to the propulsion devices 12, 14 to achieve such corrective action. Note that the actual route the vessel 10 takes as shown by the dotted line 108 is not exactly on the track 100, because the distance between the points WP1, WP2, etc. may be a matter of miles and tolerances for matching the actual route 108 to the track 100 may be high, especially given the speed at which the vessel 10 navigates the route 108.

Figure 2:
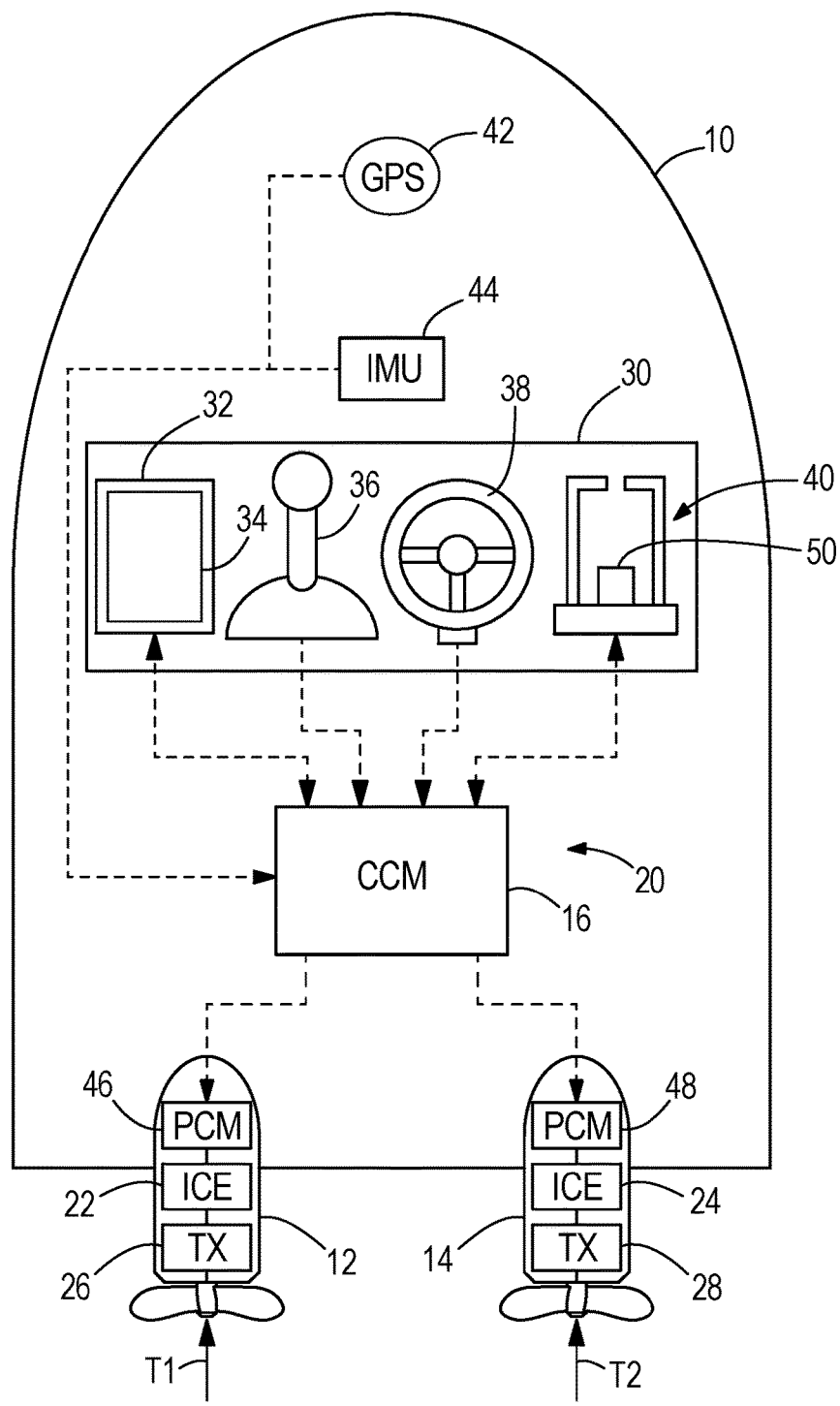
FIG. 2 is a schematic illustration of a marine vessel having a marine propulsion system according to the present disclosure.

A more detailed schematic of the marine vessel 10 is provided in FIG. 2. The marine vessel 10 includes a marine propulsion system 20 including a marine propulsion device. Here, two marine propulsion devices 12, 14 are shown, but only one propulsion device or more than two could be provided. A control module 16 (here, called a command control module) controls the magnitudes of thrusts T1, T2 of the propulsion devices 12, 14, such as by controlling speed of their internal combustion engines 22, 24. The control module 16 also controls shift positions of the propulsion devices 12, 14 between forward, neutral, and reverse by way of transmissions 26, 28. The steering angles of the propulsion devices 12, 14, which affect the angles of their thrusts T1, T2 with respect to an imaginary centerline of the marine vessel 10 running from bow to stern, are also controlled by the control module 16.

A command console 30 of the system 20 includes an electronic navigation device 32 having an operator interface 34, which will be described further herein below. The electronic navigation device 32 provides to the control module 16 a desired track 100 including a series of waypoints (see FIG. 3). For example, the electronic navigation device 32 can be a chart plotter, into which the operator of the vessel 10 can manually input desired tracks, record actual routes as tracks, or download saved tracks. As will be described herein below, the series of waypoints (WP1, WP2, etc.) making up a track 100 may include a stopover waypoint at or near which the vessel 10 is to electronically anchor. A joystick 36 and a steering wheel 38 are also provided at the command console 30, and can provide steering commands to the propulsion devices 12, 14 via the control module 16, as is known. A pair of throttle/shift levers 40 is also provided, and the levers 40 are moveable between forward, neutral, and reverse positions, which signal the control module 16 to command corresponding shift positions of the transmissions 26, 28 and various speeds of the engines 22, 24, as is also known.

The system 20 also includes a position determination device 42, such as a GPS receiver, that provides to the control module 16 a current, actual geographic location of the vessel 10 in latitude and longitude. For example, the position determination device 42 can update the actual geographic location of the vessel 10 as the vessel 10 navigates the track 100 under the command of the control module 16. The position determination device 42 can also determine the speed of the vessel 10 over water by determining how far the vessel 10 travels, as determined from GPS position, over a given period of time. A heading detector 44, such as an inertial measurement unit, may also be provided in signal communication with the control module 16. The heading detector 44 detects a current, actual heading of the vessel 10. In other examples, the heading detector is a compass. In still other examples, the position determination device 42 and heading detector 44 are part of a single device, such as an attitude and heading reference system.

The control module 16 is programmable and includes a processing system and a storage system. The control module 16 can be located anywhere on the vessel 10 and/or located remote from the vessel 10 and can communicate with various components of the vessel 10 via a peripheral interface and wired and/or wireless links, as will be explained further herein below. Although FIG. 1 shows one control module 16, the vessel 10 can include more than one control module. Portions of the method disclosed herein below can be carried out by a single control module or by several separate control modules. For example, as shown in FIG. 2, the system 20 can have a control module 16 located at or near the command console 30 of the vessel 10 and can also have control module(s) such as propulsion control modules 46, 48 located in or near the propulsion devices 12, 14. If more than one control module is provided, each can control operation of a specific device or sub-system on the vessel 10. For example, the PCMs 46, 48 can interpret and carry out commands from the CCM 16 in order to produce the thrusts T1, T2, rotate the propulsion devices 12, 14 to different steering angles, change the speed of the engines 22, 24, and change shift positions via the transmissions 26, 28. In alternative embodiments, the CCM 16 directly controls these functions of the propulsion devices 12, 14.

In some examples, the control module 16 may include a computing system that includes a processing system, storage system, software, and an input/output (I/O) interface for communicating with peripheral devices. The systems may be implemented in hardware and/or software that carries out a programmed set of instructions. For example, the processing system loads and executes software from the storage system, such as software programmed with a station keeping method, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The provided description of the control module 16 is conceptual and should be interpreted generally, as those skilled in the art will recognize many ways to implement such a control module. These include implementation using a digital microprocessor that receives input signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

The control module 16 communicates with one or more of the components on the vessel 10 via the I/O interface and a communication link, which can be a wired or wireless link. In one example, the communication link is a controller area network (CAN) bus, but other types of links could be used. The I/O interface allows the control module 16 to interact with both input devices, such as the position determination device 42, the heading detector 44, the electronic navigation device 32, the joystick 36, the steering wheel 38, and the throttle/shift levers 40, as well as with output devices such as the electronic navigation device 32, a notification device 50 on or near the throttle/shift levers, and the propulsion devices 12, 14. Other types of input devices can be provided in signal communication with the control module 16, such as keyboards, remote controls, voice command receivers, touch screens, keypads, buttons, etc., any of which may be part of the operator interface 34 on the electronic navigation device 32. In the example in which the electronic navigation device 32 is a chart plotter, the operator interface 34 may include a touch screen, display-only screen, and/or a keypad or buttons that allow the operator to select a track by scrolling through a menu or selecting it from the touch screen. The actual position of the vessel 10 along the track 100 may be displayed on the screen of the chart plotter. Other operator selections may also be made via the chart plotter, which will be described further herein below.

Current waypoint tracking methods are programmed to cause the vessel to maintain its heading and continue on after reaching the final waypoint in a list of waypoints (i.e. the "track" or "route"). In other words, the propulsion system automatically transitions into an auto-heading mode at the end of a route. If an operator instead wishes to remain at the last point in the route, he or she needs to disengage waypoint tracking mode and then enable station keeping mode. It would be desirable for an operator to be able to choose to smoothly ease into position at a final waypoint (or at a waypoint anywhere along the track) and electronically anchor there. While at an anchor point, the control module 16 may also automatically control at least one of the magnitude of thrust, shift positions, and steering angles of the propulsion devices 12, 14 so as to maintain the marine vessel 10 at the anchor point at a given heading.

Such a maneuver requires that the vessel 10 be slowed down before the final waypoint (or intermediate waypoint at which the vessel 10 is to remain temporarily before continuing on the track 100) so that station keeping can be enabled upon reaching that waypoint. For purposes of the following disclosure, the waypoint at which the vessel 10 is programmed to electronically anchor will be called a "stopover waypoint." The stopover waypoint can be selected by the operator via the operator interface 34 of the electronic navigation device 32. Alternatively, the stopover waypoint could be pre-programmed as part of the information describing the track 100. In another example, the electronic navigation device 32 or the control module 16 defaults to setting a final waypoint in the track 100 as the stopover waypoint. For example, the control module 16 may set the final waypoint WP5 as the stopover waypoint. One or more than one stopover waypoints can be programmed into a single track 100. Additionally, a stopover waypoint can be chosen on-the-fly, while the vessel 10 is already underway and navigating the track, perhaps even on its way to the designated stopover waypoint.

Referring to FIG. 3, according to the present disclosure, a virtual arrival circle 104 is developed for the exemplary stopover waypoint WP5, which virtual arrival circle 104 is at a threshold distance R from the geographic location of the stopover waypoint. In one example, a virtual arrival circle is developed for each waypoint WP1-WP5, and the waypoint tracking method transitions to the next waypoint in the track 100 when the vessel 10 crosses the arrival circle for a current waypoint. (See, for example, virtual arrive circle 106 for waypoint WP3.) The arrival circle(s) can be pre-defined in the electronic navigation device 32, can be specified by the operator, or can be based on vessel speed. In one example, the arrival circle 104 is located about 0.1 nautical miles (~600 feet) from the target stopover waypoint WP5. In other words, the threshold distance R≈0.1 nautical miles. Other threshold distances could be used. The arrival circles for the non-stopover waypoints, e.g. arrival circle 106, may be programmed with different threshold distances than that of the stopover waypoint's arrival circle 104.

In response to determining that the vessel 10 has reached the threshold distance R from the stopover waypoint WP5, the control module 16 commands the propulsion devices' magnitudes of thrust T1, T2 to decrease. For example, once the vessel 10 crosses the arrival circle 104 of the stopover waypoint WP5 at which the vessel is to electronically anchor, the system 20 will automatically slow the vessel 10 by reducing engine RPM at a given rate. The deceleration rate could be user-specified or could be pre-defined as a function of vessel speed during calibration. In one example, the given rate at which the engine speed is slowed is inversely proportional to a current, actual speed of the vessel 10 upon reaching the threshold distance R from the stopover waypoint WP5. The control module 16 may slow the engine speed at the given rate until the engine speed reaches a predefined idle speed, such as, for example, 600 RPM or the engine's rated idle speed. In other examples, the engine speed need not be ramped all the way down to idle, such as if external forces tending to push the vessel 10 away from the stopover waypoint WP5 are detected, in which case some (albeit lesser) forward thrust might be required to keep the vessel 10 moving toward the stopover waypoint WP5.

Once the system 20 has ramped the engines' RPM down to idle or to a lesser, predetermined speed, the vessel 10 may still be underway due to momentum. Two different methods could then be used to transition into station keeping at or near the stopover waypoint WP5. In both methods, in response to sensing that the vessel 10 has slowed to a first threshold speed, the control module 16 commands the propulsion system 20 to further decrease vessel speed; and in response to sensing that one of (a) the vessel 10 has thereafter slowed to a second threshold speed that is less than the first threshold speed or (b) a distance between the vessel 10 and the stopover waypoint WP5 has thereafter begun to increase, the control module 16 controls at least one of the magnitudes of thrusts T1, T2, shift positions of transmissions 26, 28, and steering angles of the propulsion devices 12, 14 so as to maintain the vessel 10 at an anchor point that is at or near the stopover waypoint WP5. Regarding the first portion of each method, note that the propulsion system 20 can further decrease vessel speed in a number of ways, including but not limited to the following: if the speeds of engines 22, 24 were not ramped to idle, the engine speeds could be further decreased; if the engine speeds were ramped to idle, the transmissions 26, 28 could be shifted to or maintained in neutral for a given amount of time; if the engine speeds were ramped to idle, the transmissions 26, 28 could be shifted into reverse and a given amount of reverse thrust could be produced; the propulsion devices 12, 14 could be steered in toward one another to a given toe angle to cause drag on the vessel 10; or trim tabs or interceptors could be lowered to cause drag on the vessel 10. Regarding the second portion of each method, if the efforts of the propulsion system 20 to further decrease vessel speed are successful, the vessel 10 may slow to the second threshold speed before reaching the stopover waypoint. However, if the vessel 10 is not slowed enough before reaching the stopover waypoint WP5, the position error may thereafter begin to increase as the vessel 10 moves beyond the stopover waypoint. In both instances, in order to electronically anchor the vessel 10 in the vicinity of the stopover waypoint WP5, the method then proceeds as described herein below.

Figure 4:
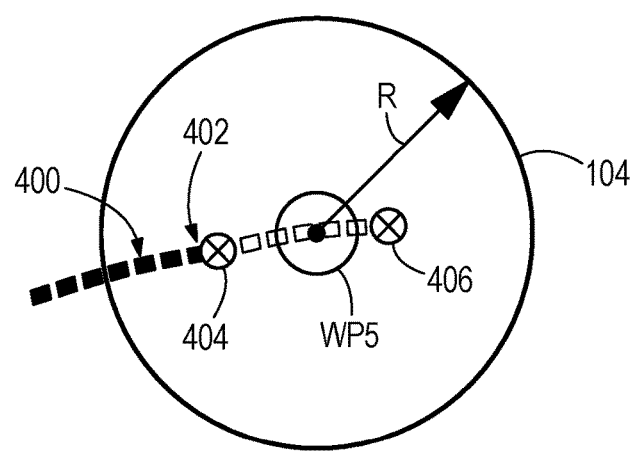
FIG. 4 is used to illustrate a first method for station keeping near a stopover waypoint.

According to the first method, which is shown in FIG. 4, upon ramping the engines 22, 24 to lower rotational speeds (e.g., to idle speed), the system 20 may enable station keeping but not yet set an anchor point. Once the vessel speed reaches the first threshold speed, as shown at location 400, the control module 16 will cause the propulsion system 20 to slow the vessel 10 down even more using one of the methods described above. For example, the propulsion system 20 may slow the vessel 10 even more by engaging reverse gears of the transmissions 26, 28 in order to cause a slight reverse thrust that effectively brakes the vessel 10. Next, according to option (a), once the vessel 10 slows to the second threshold speed, as shown at location 402, the system 20 will set the station keeping anchor point. The anchor point 404 will therefore be at the geographical location of the vessel 10 at the moment the second threshold speed is met or very shortly thereafter. Alternatively, according to option (b), once the distance between the vessel 10 and the stopover waypoint WP5 begins to increase, the system 20 will set the station keeping anchor point, as shown at 406. In one example, the control module 16 sets the current, actual geographic location of the vessel 10 as the anchor point 404 in response to reaching the second threshold speed or as the anchor point 406 in response to the distance between the vessel 10 and the stopover waypoint WP5 increasing after having been at a minimum. The anchor point 404 or 406 in these examples might not necessarily be at the location of the pre-selected stopover waypoint WP5, but would be inside the arrival circle 104 for the selected stopover waypoint WP5. The control module 16 may set a current, actual heading of the vessel 10 as the given heading in response to reaching the second threshold speed. In this case, the vessel 10 would be maintained at the anchor point at the heading at which the vessel 10 had already been traveling. Alternatively, an operator-selected heading may be maintained at the anchor point 404 or 406.

Figure 5:
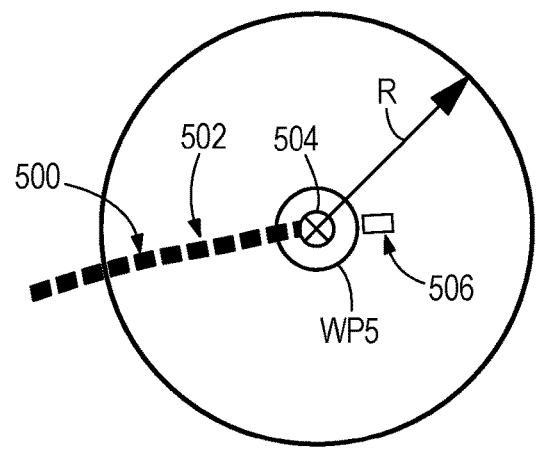
FIG. 5 is used to illustrate a second method for station keeping at a stopover waypoint.

As a second option, shown in FIG. 5, once the speeds of engines 22, 24 are ramped down (e.g., to idle speed), the system 20 may enable station keeping and set the anchor point to the coordinates of the predetermined stopover waypoint on the route, but not yet enable station keeping control. In other words, the control module 16 sets a geographic location of the stopover waypoint WP5 as the anchor point 504. Once the vessel 10 reaches the first threshold speed, as shown at 500, the propulsion system 20 will be controlled to further decrease vessel speed, for example, by using the engine RPM in reverse to brake the vessel 10 down to the second threshold speed. Once the vessel 10 reaches the second threshold speed, as shown at 502, the station keeping control is enabled and the propulsion devices 12, 14 will be controlled to cause the vessel 10 to arrive exactly at the anchor point 504 (i.e., at the latitude and longitude of the stopover waypoint WP5) by propelling the vessel 10 forwards. Alternatively, once the distance between the vessel 10 and the stopover waypoint WP5 has begun to increase after having been at a minimum, such as shown at 506, the station keeping control is enabled and the propulsion devices 12, 14 will be controlled to cause the vessel 10 to arrive exactly at the anchor point 504, such as by propelling the vessel 10 backwards. The control module 16 may set an operator-selected heading as the given heading, may set a pre-defined heading provided along with information about the track 100 as the given heading, or may set the current heading of the vessel 10 as it arrives at the anchor point 504 as the given heading to be maintained at the anchor point 504.

Note that the vessel's heading could also be controlled to an operator-selected heading even before the vessel 10 reaches the anchor point 404, 406, or 504, such as along the track 100 and/or as the vessel 10 slows inside the arrival circle 104. The operator-selected heading at which the vessel 10 is maintained (whether this is done along the track 100 or at the anchor point) could be any one of the following: the heading the vessel 10 was at while traversing the track 100, a compass heading selected from a gauge or chart plotter, a pre-defined heading associated with the particular stopover waypoint according to pre-defined track information, or a direction selected via a joystick or steering wheel. Additionally, the heading can be offset or jogged by predefined increments by use of buttons on a gauge or chart plotter, or by rotating or otherwise actuating a joystick or steering wheel.

In either example of FIG. 4 or FIG. 5, the system 20 will enter into station keeping mode with the throttle/shift lever(s) 40 in a non-neutral position if the operator was controlling vessel speed with the levers 40 while in waypoint tracking mode. A notification device 50 at the command console 30, such as on the throttle/shift levers' base, could prompt the operator to pull the levers 40 back to neutral once station keeping is fully engaged. In other words, the control module 16 is programmed to generate a prompt while the vessel 10 is being maintained at the anchor point 404, 406, or 504, wherein the prompt alerts an operator of the vessel 10 to move a throttle/shift levers 40 of the propulsion system 20 to a neutral position, such as the upright position shown in FIG. 3. The prompt may be a light that goes on, words that flash across a screen, an outputted voice command, and/or a beep or other type of tone at the notification device 50. In another example, the notification is a haptic notification, such as a vibration of the throttle/shift levers 40 or another part of the command console 30, such as the steering wheel 38, the joystick 36, and/or the operator's seat. A haptic notification could also be provided on a wearable device, such as a smartwatch linked to the propulsion system 20. In an alternative example, the system 20 might be programmed to ignore the lever positions until the operator pulls all throttle/shift levers 40 back to neutral and then either disengages station keeping or shifts back into gear. For example, the control module 16 may be programmed to disregard a position of the throttle/shift levers 40 of the propulsion system 20 until an operator of the vessel 10 moves the throttle/shift levers 40 to a neutral position and subsequently commands the vessel 10 to move off the anchor point 404 or 504 or to rotate away from the given heading at which the vessel 10 is being maintained.

The same concept for engaging station keeping at a stopover waypoint could be applied to a joystick-based route system. In this case, the throttle/shift levers 40 would already be in the neutral position, so a lever latching strategy would not be required.

An interactive display device could act as the operator interface 34 to allow the operator to choose whether he or she wishes to continue with auto-heading at the end of the track 100 or to electronically anchor at the last waypoint WP5, and which method of coming to a stop is preferred. The operator interface 34 could also be used to allow the operator to choose to stop at an intermediate waypoint, and for how long. The operator interface 34 might also allow an operator of the vessel 10 to select one or more of the track 100, the stopover waypoint(s) on the track 100, the threshold distance R at which the engine speed is ramped down, the rate at which the engine speed is ramped down, the first threshold speed at which the propulsion system 20 is controlled to further decrease vessel speed (e.g., the speed at which the transmissions 26, 28 are shifted to reverse), and/or the second threshold speed after which the vessel is held at the anchor point.

Figure 6:
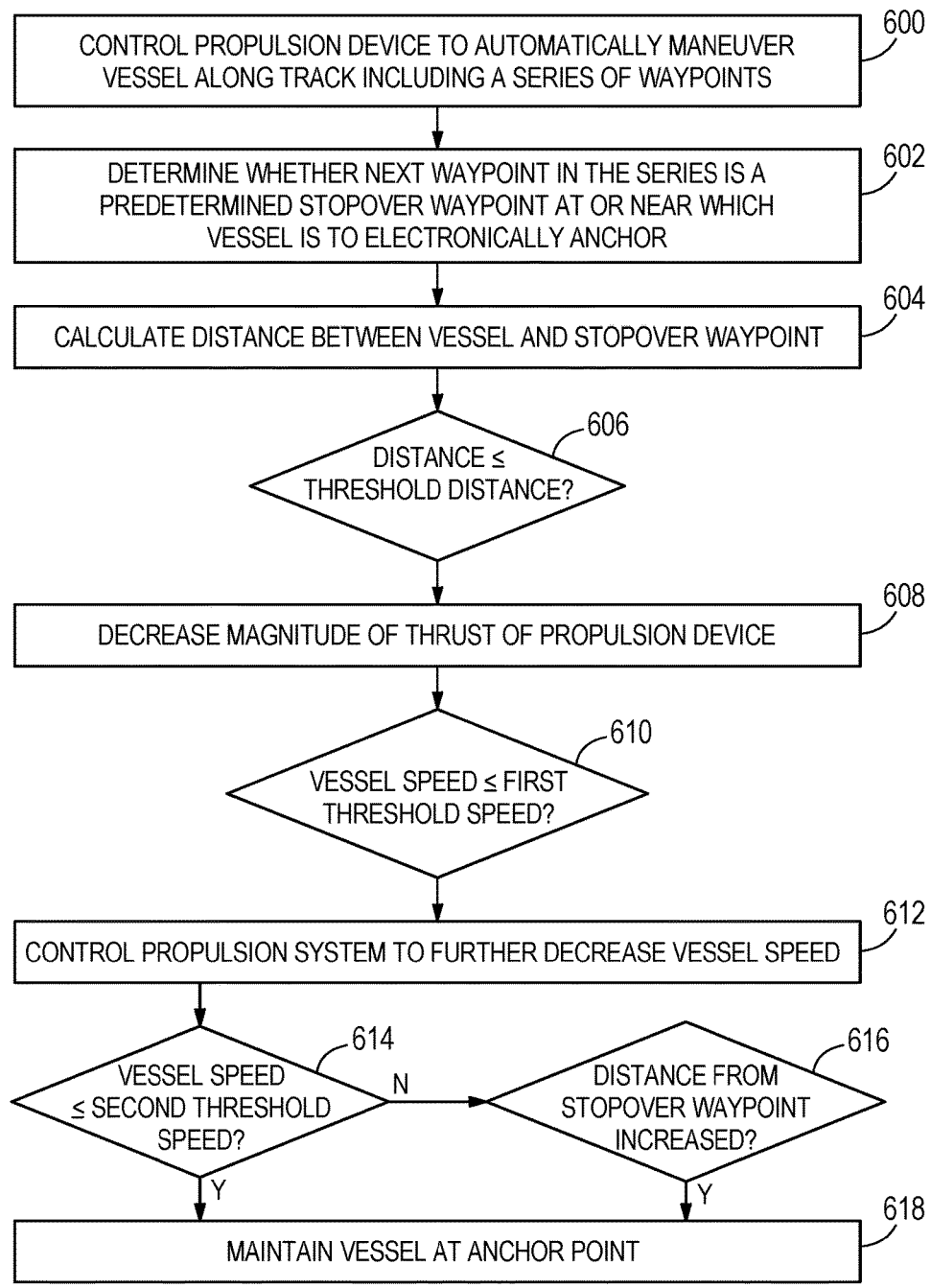
FIG. 6 illustrates a method according to the present disclosure.

FIG. 6 illustrates one example of a method for controlling movement of a marine vessel 10 powered by a marine propulsion system 20 commanded by a control module 16. The method is carried out by the control module 16 and includes controlling propulsion devices 12, 14 of the propulsion system 20 so as to automatically maneuver the vessel 10 along a track 100 including a series of waypoints (e.g., WP1-WP5), as shown at 600. As shown at 602, the method includes determining whether a next waypoint in the series of waypoints is a predetermined stopover waypoint at or near which the vessel 10 is to electronically anchor. That the next waypoint is a stopover waypoint may be chosen by the operator via the electronic navigation device 32 while en route to the next waypoint. Alternatively, that the next waypoint is a stopover waypoint may be programmed into the information associated with the track 100, and the electronic navigation device 32 and/or the control module 16 may be programmed to recognize a flag associated with a particular waypoint that indicates the waypoint is a stopover waypoint.

If the next waypoint is not a stopover waypoint, the method ends and the control module 16 continues to propel the vessel 10 along the track 100. As shown at 604, in response to determining that the next waypoint is the stopover waypoint, the method includes calculating a distance between the vessel 10 and the stopover waypoint. The distance can be calculated knowing the latitude/longitude of the stopover waypoint as provided by the electronic navigation device 32 and the latitude/longitude of the current, actual geographical position of the vessel 10 as determined by the position determination device 42. As shown at 606, in response to the calculated distance being less than or equal to a threshold distance, the method includes decreasing magnitudes of thrust T1, T2 of the propulsion devices 12, 14, as shown at 608. In one example, the threshold distance R defines an arrival circle 104 around the stopover waypoint WP5, and is either programmed into the information describing the track 100 or is selected by the operator. If the calculated distance is not less than or equal to the threshold distance R, then the method waits until the determination at 606 is true before continuing to 608. The threshold distance R may be user-selected, may be programmed into the track information, or may be based on vessel speed at the time the vessel 10 reaches the threshold distance R from the stopover waypoint WP5. The thrusts T1, T2 of the propulsion devices 12, 14 may be decreased at a given rate, which may be predetermined such as according to the information associated with the track 100, selected by the operator, based on the threshold distance R, or based on the vessel speed as the vessel 10 crossed the arrival circle 104. The thrusts T1, T2 may be decreased by decreasing the speed of the engines 22, 24 and/or by increasing a gear-ratio in the transmissions 26, 26, if more than one gear is provided. Alternatives for decreasing the speed of the engines are provided herein above.

As shown at 610, in response to sensing that the vessel 10 has thereafter slowed to a first threshold speed, the method includes controlling the propulsion system 20 to further decrease vessel speed, as shown at 612. The vessel speed may be determined from a vessel speed sensor such as a pitot tube or paddle wheel or may be determined based on position change (from the position determination device 42) over time. The method may wait until the determination at 610 is true before moving to 612, or the control module 16 may be programmed to wait for a predetermined period of time before further reducing vessel speed, such as by braking by shifting the transmissions 26, 28 into reverse. The latter option may be a fail safe in case the threshold distance R and/or rate of thrust decline were chosen by the operator and do not provide enough distance or time for the vessel 10 to slow before reaching the stopover waypoint. As shown at 614, in response to sensing that the vessel 10 has thereafter slowed to a second threshold speed that is less than the first threshold speed, the method includes controlling the propulsion devices 12, 14 so as to maintain the vessel 10 at an anchor point 404 or 504 that is at or near the stopover waypoint WP5, as shown at 618. Alternatively, as shown at 616, in response to sensing that the calculated distance between the vessel 10 and the stopover waypoint WP5 has thereafter begun to increase, the method includes controlling the propulsion devices 12, 14 so as to maintain the vessel 10 at an anchor point 406 or 504 that is at or near the stopover waypoint WP5, as shown at 618.

In one or more examples of the method, the method includes automatically controlling at least one of the magnitude of thrust, a shift position, and a steering angle of the propulsion devices 12, 14 so as to maintain the marine vessel 10 at the anchor point at a given heading. The method may also include setting a current, actual geographic location of the vessel 10 as the anchor point and/or setting a current, actual heading of the vessel 10 as the given heading in response to reaching the second threshold speed at 614 or in response to passing the stopover waypoint at 616. Alternatively, the method includes setting a geographic location of the stopover waypoint as the anchor point and/or setting an operator-selected heading as the given heading.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for controlling movement of a marine vessel powered by a marine propulsion system commanded by a control module, the method being carried out by the control module and comprising:
controlling a propulsion device of the marine propulsion system so as to automatically maneuver the marine vessel along a track including a series of waypoints;
determining whether a next waypoint in the series of waypoints is a predetermined stopover waypoint at or near which the marine vessel is to electronically anchor;
in response to determining that the next waypoint is the predetermined stopover waypoint, calculating a distance between the marine vessel and the predetermined stopover waypoint;
in response to the calculated distance being less than or equal to a threshold distance, decreasing a magnitude of thrust of the propulsion device;
in response to sensing that the marine vessel has thereafter slowed to a first threshold speed, controlling the marine propulsion system to further decrease vessel speed; and
in response to sensing that one of (a) the marine vessel has thereafter slowed to a second threshold speed that is less than the first threshold speed or (b) the calculated distance has thereafter begun to increase, controlling the propulsion device so as to maintain the marine vessel at an anchor point that is at or near the predetermined stopover waypoint.

2. The method of claim 1, further comprising automatically controlling at least one of the magnitude of thrust, a shift position, and a steering angle of the propulsion device so as to maintain the marine vessel at a given heading.

3. The method of claim 2, further comprising setting a current, actual geographic location of the marine vessel as the anchor point in response to reaching the second threshold speed or in response to the calculated distance increasing.

4. The method of claim 3, further comprising setting a current, actual heading of the marine vessel as the given heading in response to reaching the second threshold speed or in response to the calculated distance increasing.

5. The method of claim 2, further comprising setting a geographic location of the predetermined stopover waypoint as the anchor point.

6. The method of claim 5, further comprising setting an operator-selected heading as the given heading.

7. The method of claim 1, further comprising decreasing the propulsion device's magnitude of thrust upon reaching the threshold distance from the predetermined stopover waypoint by slowing a speed of an engine of the propulsion device at a given rate.

8. The method of claim 7, wherein the given rate at which the engine speed is slowed is inversely proportional to a current, actual speed of the marine vessel upon reaching the threshold distance from the predetermined stopover waypoint.

9. The method of claim 7, further comprising slowing the engine speed at the given rate until the engine speed reaches a predefined idle speed.

10. The method of claim 2, further comprising disregarding a position of a throttle lever of the marine propulsion system until an operator of the marine vessel moves the throttle lever to a neutral position and subsequently commands the marine vessel to move off the anchor point or to rotate away from the given heading.

11. The method of claim 1, further comprising generating a prompt while the marine vessel is being maintained at the anchor point, wherein the prompt alerts an operator of the marine vessel to move a throttle lever of the marine propulsion system to a neutral position.

12. The method of claim 1, further comprising shifting the propulsion device into reverse in response to sensing that the marine vessel has slowed to the first threshold speed.

13. A system for controlling movement of a marine vessel, the system comprising:
a marine propulsion system including a marine propulsion device;
a control module that controls a magnitude of thrust, a shift position, and a steering angle of the marine propulsion device;
an electronic navigation device that provides to the control module a desired track including a series of waypoints, wherein the series of waypoints includes a stopover waypoint at or near which the marine vessel is to electronically anchor; and
a position determination device that provides to the control module a current, actual geographic location of the marine vessel as the marine vessel navigates the desired track under the command of the control module;
wherein, in response to determining that the marine vessel has reached a threshold distance from the stopover waypoint, the control module commands the marine propulsion device's magnitude of thrust to decrease;
wherein, in response to sensing that the marine vessel has thereafter slowed to a first threshold speed, the control module commands the marine propulsion system to further decrease vessel speed; and
wherein, in response to sensing that one of (a) the marine vessel has thereafter slowed to a second threshold speed that is less than the first threshold speed or (b) a distance between the marine vessel and the stopover waypoint has thereafter begun to increase, the control module controls at least one of the magnitude of thrust, the shift position, and the steering angle of the marine propulsion device so as to maintain the marine vessel at an anchor point that is at or near the stopover waypoint.

14. The system of claim 13, further comprising a heading detector that detects a heading of the marine vessel, wherein the control module controls at least one of the magnitude of thrust, the shift position, and the steering angle of the marine propulsion device so as to maintain the marine vessel at a heading that is equal to a given heading.

15. The system of claim 14, wherein, in response to the marine vessel reaching the second threshold speed or in response to the distance between the marine vessel and the stopover waypoint increasing, the control module sets the given heading as one of a current, actual heading of the marine vessel or an operator-selected heading.

16. The system of claim 15, wherein the control module sets a geographic location of the stopover waypoint as the anchor point.

17. The system of claim 15, wherein, in response to the marine vessel reaching the second threshold speed or in response to the distance between the marine vessel and the stopover waypoint increasing, the control module sets the current, actual geographic location of the marine vessel as the anchor point.

18. The system of claim 14, wherein the marine propulsion system further includes a throttle lever, and wherein the control module disregards a position of the throttle lever until an operator of the marine vessel moves the throttle lever to a neutral position and subsequently commands the marine vessel to move off the anchor point or to rotate away from the given heading.

19. The system of claim 13, wherein the marine propulsion system further includes a throttle lever and a notification device, and wherein the control module commands the notification device to emit a prompt that alerts an operator of the marine vessel to move the throttle lever to a neutral position while the marine vessel is being maintained at the anchor point.

20. The system of claim 13, wherein the electronic navigation device is a chart plotter including an operator interface that allows an operator of the marine vessel to select one or more of the desired track, the stopover waypoint, the threshold distance, the first threshold speed, and the second threshold speed.

21. The system of claim 13, wherein the control module defaults to setting a final waypoint in the desired track as the stopover waypoint.

22. The system of claim 13, wherein, in response to sensing that the marine vessel has slowed to the first threshold speed, the control module commands the marine propulsion device to shift into reverse.

* * * * *